July 14, 1953
N. H. CURTISS
2,644,983
TUBE EXTRUSION
Filed June 29, 1950
3 Sheets-Sheet 1
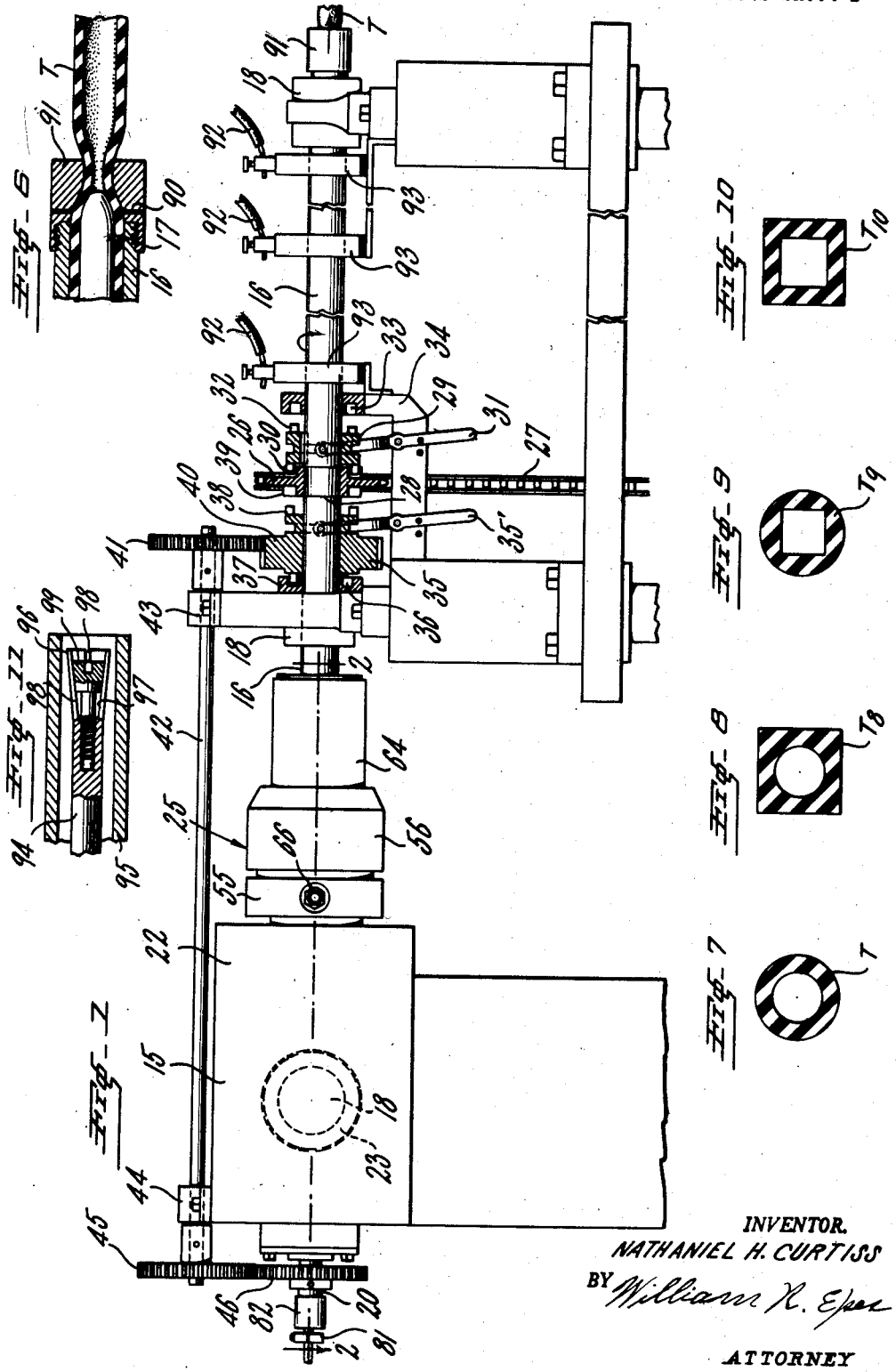
INVENTOR.
NATHANIEL H. CURTISS
BY William R. Eper
ATTORNEY July 14, 1953
N. H. CURTISS
2,644,983
TUBE EXTRUSION
Filed June 29, 1950
3 Sheets-Sheet 2
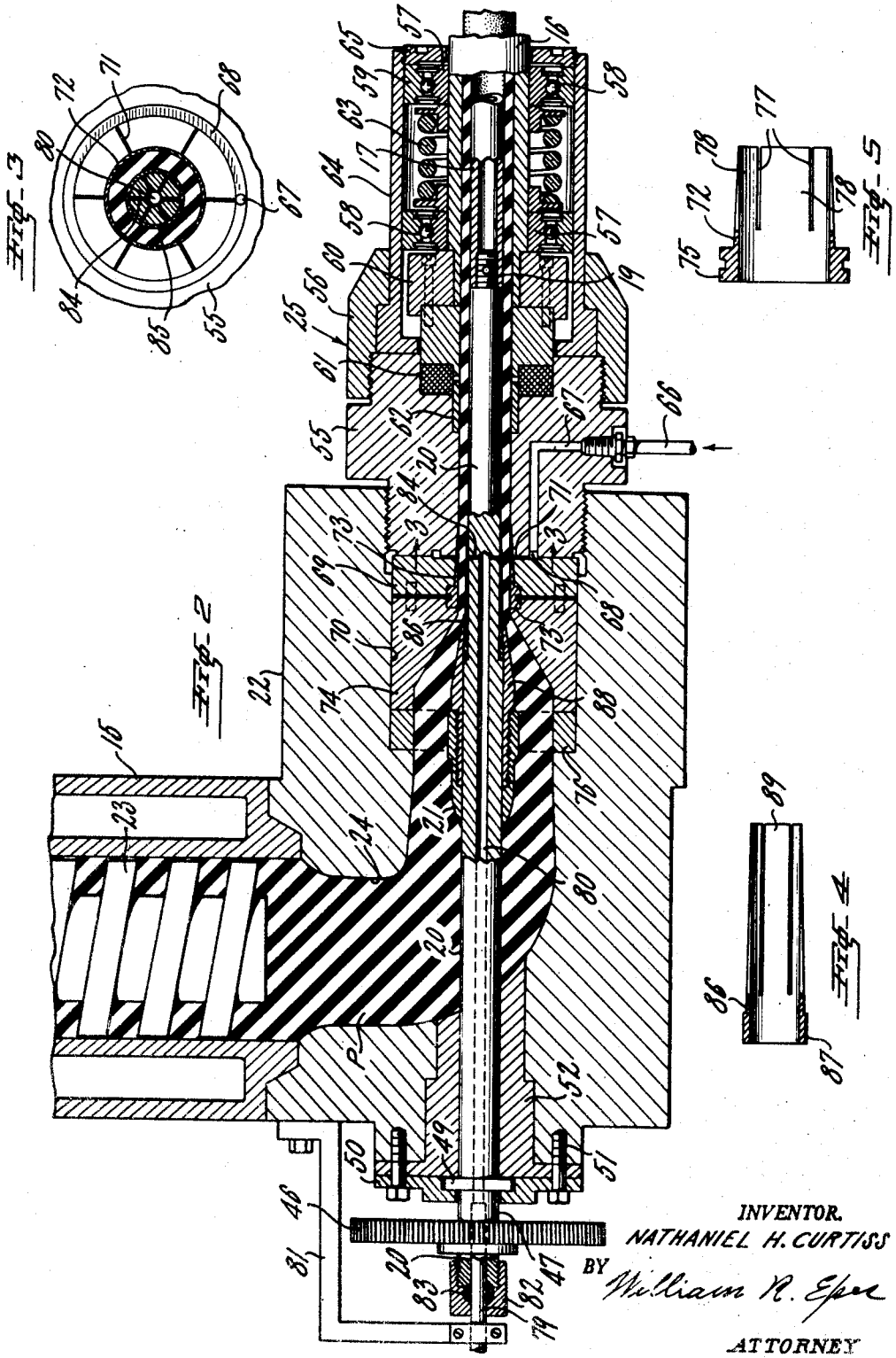
INVENTOR.
NATHANIEL H. CURTISS
BY
William R. Eper
ATTORNEY

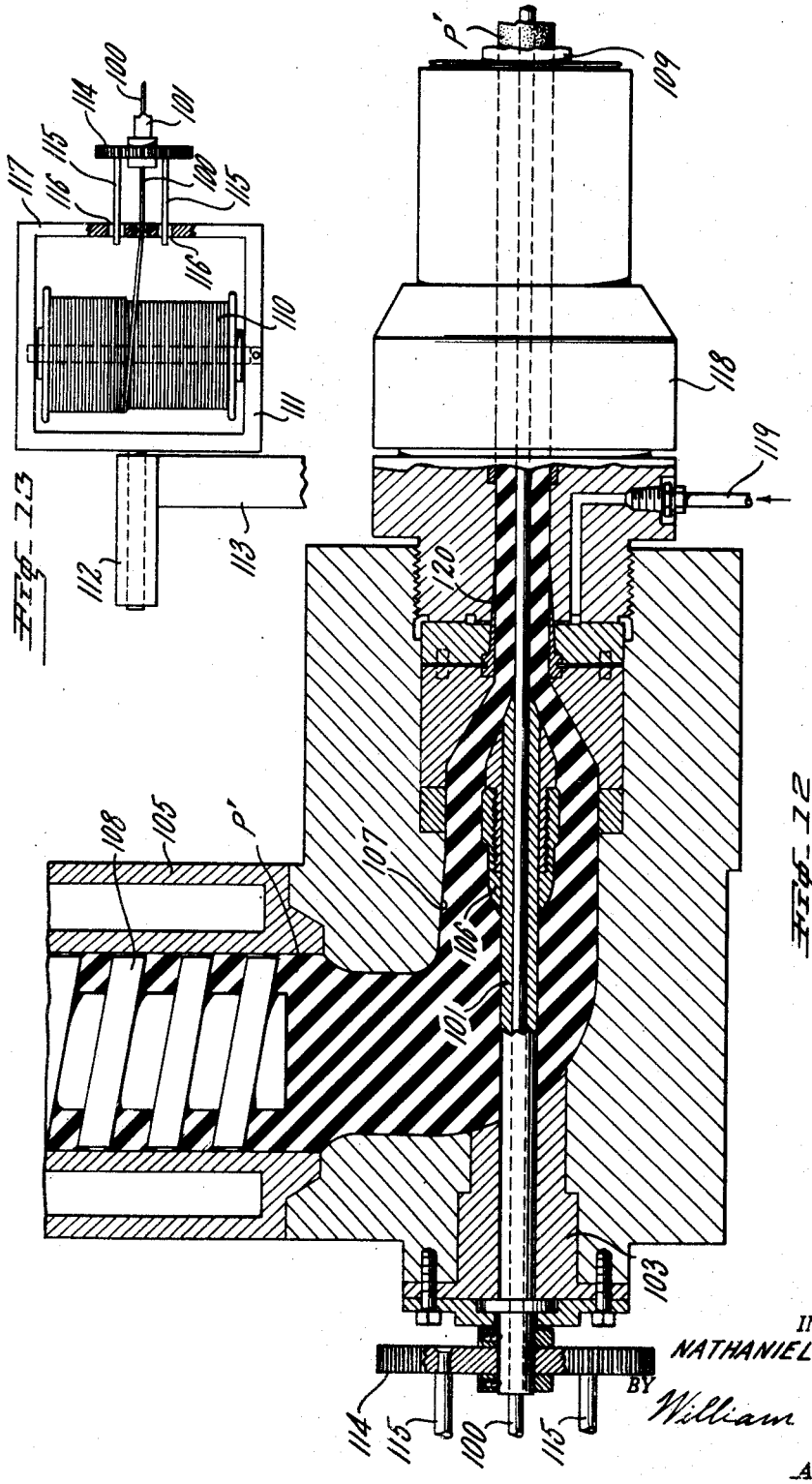

Patented July 14, 1953

2,644,983

UNITED STATES PATENT OFFICE 2,644,983

TUBE EXTRUSION

Nathaniel H. Curtiss, Clifton, N. J., assignor to United States Rubber Company, New York, N. Y., a corporation of New Jersey Application June 29, 1950, Serial No. 171,217

15 Claims. (Cl. 18—14)

This invention relates to an improved method and apparatus for producing plastic tubes by continuously extruding a tube of plastic material through an annular passage formed between a relatively long deflectable core and a surrounding sleeve and suspending the deflectable portion of the core on the plastic centrally of the sleeve until the plastic has been set.

The invention is useful in the manufacture of tubes having uniform and concentric inside and outside cross-sectional dimensions. The tubes may be of various transverse cross-section shapes and may be hollow or form tubular jackets for cores, such as the insulation on electrical cables or the like.

Heretofore, plastics have been extruded through short and long sleeves to form the outside cross-sectional dimensions and around cores in the sleeves to form the inside cross-sectional dimensions of tubes. While it has been practical to maintain the cores centrally in short sleeves for the production of tubes having concentric inside and outside cross-sectional dimensions at the time they were discharged from the sleeve, but it was impractical to set some types of plastics in the sleeve before such plastics had been discharged, and the tubes often became deformed before the flowable plastics could be subsequently set.

Heretofore in the use of sleeves and cores of sufficient length to permit the plastic to be set on the core and while confined between the core and the sleeve, the suspended length of the core in the sleeve was so flexible and it was so heavy that it was either deflected by gravity or by the unbalanced forces of the flow of the plastic against the core. Such deflections caused the core to assume an eccentric position in respect to the surrounding plastic and the bore in the sleeve. When the plastic was set on the core in such eccentric relationship, a tube having eccentric inner and outer cross-sectional dimensions was produced as a final product.

According to the present invention a continuous length of set plastic tube having concentric inside and outside cross-sectional dimensions is produced by extruding plastic through a sleeve of sufficient length to permit the plastic to be set while confined between the sleeve and a deflectable core therein. The core is firmly supported centrally of the sleeve near one end thereof only. The suspended length of the core within the sleeve is floated on the plastic and maintained concentric with the surrounding plastic and the bore in the sleeve by rotating either the sleeve or the core. The surrounding plastic is set in the sleeve and around the core while the latter is maintained in its concentric relationship with the plastic and the sleeve.

The term "set" as used herein pertains to that state of the plastic in which it maintains its shape under normal conditions when at rest and free from imposed pressures at normal temperatures. The plastic may be set as a result of heat treatment, as in the case of thermosetting plastics, or it may be set as a result of cooling as in the case of thermoplastic plastics, or it may be set by chemical change.

An apparatus embodying this invention and adapted to carry out the method comprising this invention is further described in connection with the accompanying drawings, in which:

Fig. 1 is a side elevational view of an apparatus embodying this invention, which shows parts broken away and in section;

Fig. 2 is a horizontal sectional view of a portion of the apparatus taken on line 2—2 of Fig. 1, and shows the extruding apparatus, which is adapted to force the plastic material into an outer sleeve and around a core therein;

Fig. 3 is an enlarged cross-section of a portion of the apparatus taken on line 3—3 of Fig. 2, and shows means for lubricating the inner and outer surfaces of the plastic material;

Fig. 4 is a cross-section of the internal lubricant distributing device shown in Figs. 2 and 3;

Fig. 5 is a cross-sectional view of the outer lubricant distributing device;

Fig. 6 is a cross-sectional view of the end of the outer sleeve which discloses the floating inner core, and means for expelling the excess lubricant material, together with means for snubbing the plastic tube being discharged from the sleeve for the purpose of creating a back pressure on the plastic within the outer sleeve;

Figs. 7, 8, 9 and 10 are cross-sectional views of transverse sections of plastic tubes, or plastic tubular jackets, which may be formed by corresponding shapes of outer sleeves and inner cores, which conform respectively to the outer and inner dimensions of the cross-sectional views shown in the respective figures;

Fig. 11 is a longitudinal cross-sectional view of a modified form of snubber for the plastic tube, which is attached to the core instead of to the sleeve;

Fig. 12 is a cross-sectional view of a modification of the apparatus shown in Figs. 1 and 2, and which is adapted to extrude a tubular jacket on a core which passes through the outer sleeve of the apparatus along with the plastic jacket formed thereon; and Fig. 13 is a side elevational view of an apparatus for feeding a reeled cable core to the core covering apparatus in Fig. 12.

The apparatus embodying this invention is generally shown in Figs. 1 and 2 of the drawings. As illustrated, it comprises an extruder head 15 of the cross-head type, to which is connected a relatively long outer sleeve 16 having an internal core 17 of substantially the same length as the sleeve. The sleeve 16 is rotatably supported in bearings 18. The core 17 (Fig. 2) is connected by a suitable joint 19 to a shaft 20 which is rotatable in a bearing in a spider 21 on the cross-head 22 of the extruder 15. The bearing in the spider 21 maintains the core at that point concentric with the bore in the sleeve 16. The extruder screw 23 is adapted to force plastic material P into the passage 24 of the extruder cross-head 22, which is connected to the sleeve 16 by a rotary coupling 25, to be hereinafter described. The plastic P is forced around the core 17 and through the space between the core and the sleeve 16 to produce a tubular jacket around the core. Where the core 17 is held against axial movement, as shown in Figs. 1 and 2, the plastic P slips over the end of the core, as shown in Fig. 6, and emerges from the end of the sleeve 17 in the form of a hollow tube T.

In order to facilitate production and prevent the plastic article from being deformed after it leaves the sleeve 16, it is desirable to set the plastic in the sleeve under the confining pressure of the core and the sleeve. For that purpose, a sleeve and core having the required length is used to give the plastic sufficient time to set during the period of its travel in the sleeve. In practice it has been found that a sleeve fifteen or more feet in length is sufficient. A sleeve and core of such great length are sufficiently flexible to be deflected along their longitudinal axes in respect to each other by forces of gravity and the unbalanced pressures of the plastic against the core, unless the sleeve and the core are supported along their axes at suitably spaced points.

In the event the relative deflection results in an eccentric arrangement of the axis of the sleeve and the core during the passage of the plastic through the sleeve, a tube having an eccentric bore, or eccentric outer and inner cross-sectional dimensions, is produced. Therefore, for the production of tubes or tubular jackets having concentric outer and inner wall surfaces, it is necessary to support the long flexible sleeve and core at points sufficiently close together to maintain the longitudinal axes of the members concentric with respect to each other.

It will be noted that the longitudinal axis of the bore in the sleeve is maintained in a fixed straight line by the aligned bearings 18, or by additional other such bearings, which may be suitably placed between the bearings 18. However, it is not practical to provide fixed bearings or supports within the sleeve 16 at a sufficient distance from its inlet end to prevent the core 17 from being deflected either by the gravitational forces, or the unbalanced pressure of the plastic on the core.

In accordance with this invention, the deflectable portion of the core 17 which extends into the sleeve 16 is maintained concentric with the bore in the sleeve during the passage of the plastic therethrough by either rotating the sleeve or core relatively to each other about their longitudinal axes, or by rotating the sleeve and the core together at the same rate of speed about their longitudinal axes, and thereby floating the suspended weight of the core on the plastic in a concentric relation to the bore in the sleeve. The core and the sleeve are thus maintained concentric with each other, and the plastic is set around the core in this concentric relationship, whereby a tube or a tubular jacket having concentric inner and outer cross-sectional dimensions is produced.

The mechanism for rotating the sleeve 16 and/or the core 17 in the manner described above comprises a sprocket 26, which rotates freely on the sleeve 16 and is driven by a sprocket chain 27. The sprocket 26 is restrained against axial movement by the groove 28 in the sleeve 16 within which the hub of the sprocket is recessed. The hub may be assembled in such position by using a split sprocket and clamping it around the sleeve 16 so that it will rotate thereon. For the purpose of rotating the sleeve 16 in the rotary bearings 18, a clutch collar 29 is slidably splined to the sleeve 16 and is provided with clutch teeth 30 for engaging corresponding teeth in the hub of the sprocket 26. As shown in Fig. 1, the teeth 30 have been engaged with the teeth of the sprocket by the operating handle 31, and in which position the sleeve 16 is adapted to be rotated by the sprocket 26.

When it is desired to retain the sleeve 16 stationary, the clutch collar 29 is moved to the right so that the teeth 30 are disengaged from the sprocket teeth, and the collar teeth 32 on the opposite side of the collar 29 are moved into engagement with teeth 33 in a stationary arm 34.

The inner core 17 may be held stationary or rotated while the sleeve 16 is being rotated by the connection of the clutch collar 29 with the sprocket 26, as shown in Fig. 1, or while the sleeve is held stationary by the connection of the clutch collar 29 with the stationary arm 34. The core 17 may be either held stationary or rotated by means of a clutch collar 35, which is axially slidable and rotatable on the sleeve 16. The clutch collar 35 is provided with teeth 36 which are in engagement with teeth in a fixed member 37. In such position the collar 35 is adapted to retain the core 17 in a non-rotatable position. In order to rotate the core 17, the clutch collar 35 may be moved axially along the sleeve 16 by a handle 35' to disengage its teeth 36 with the member 37, and engage its teeth 38 with teeth 39 on the sprocket 26. The clutch collar 35 is built integrally with a spur gear 40 which is adapted to mesh with a spur gear 41 keyed to a shaft 42, which is rotatably mounted in bearings 43 and 44. A spur gear 45 is keyed to the opposite end of the shaft 42, and it meshes with a gear 46, which is keyed to the extension shaft 20 of the core 17.

It will thus be noted that the apparatus may be operated by the rotation of the sprocket 26 as follows:

1. When the clutch collar 35 with the gear 40 thereon is connected to the stationary member 37, and the collar 29 is connected to the sprocket 26, the core 17 is held stationary and the sleeve 16 is rotated.

2. When the clutch collars 35 and 29 are both connected to the sprocket 26, the core 17 and the sleeve 16 will be both rotated in the same direction, and at the same speed provided the gear ratio between the gears 40, 41, and 45, 46 is designed in accordance with well known practices.

3. When the clutch 29 is connected to the stationary arm 34, and the clutch 35 is connected to the sprocket 26, the sleeve 16 will be held stationary and the core 17 will be rotated therein.

For the purpose of preventing the core 17 from moving axially in the sleeve 16, the extension shaft 20 of the core is provided with a collar 49, which is affixed thereto, and is retained against axial movement by a flange 50, which is affixed to the body of the extruder 15 by cap screws 51 at the end of the rear bearing 52 for the shaft 20.

The outer sleeve 16 is connected to the head of the extruder 15 by the rotary coupling 25, which comprises a nipple 55, which is screwed into the head of the extruder 15 and to which the sleeve is coupled by a flange nut 56. The sleeve 16 extends into and is axially slidable on the inner races 57 of the ball bearings 58, which are retained between the inner race rings 57 and the outer race rings 59. The inner end of the sleeve 16 extends into and is affixed to a thrust block 60 which bears against and is adapted to rotate on a packing gland 61 in the nipple 55. A sleeve 62 is recessed in the nipple 55 to protect the inner periphery of the gland packing 61 from the plastic flowing therethrough. The end of the sleeve 62 is slightly spaced from the end of the rotary thrust block 60 to permit the packing 61 to take the thrust of the block 60. Thrust pressure is applied to the block 60 by a coil spring 63 interposed between the ball bearing races 57. The outer ball races 59 are slidably supported in a stationary housing 64, which is affixed to the nipple 55 by the nut 56. The outer end of the housing 64 is provided with a flange thrust nut 65 for retaining the ball races therein against the thrust of the coil spring 63. The coil spring thereby exerts spring pressure on the thrust block 60 which is connected to the end of the outer sleeve, and provides a spring pressed seal between the thrust block 60 which rotates with the sleeve 16 on the packing 61.

In some types of extrudable plastics, such as plasticized vulcanizable rubber, either natural or synthetic, it is necessary to lubricate the inner and outer walls of the plastic tube, or the outer wall of a tubular jacket, in order to force such plastic articles through the long sleeve 16. Suitable lubricants for this purpose are glycerine, paraffin oils, and silicone oils, which latter are liquid mixtures of low molecular weight linear polymeric organo siloxanes. The lubricant for the outer surface of the plastic tube is fed under pressure through a pipe 66 to a conduit 67 in the nipple 55. The conduit 67 is connected to an annular passage 68 formed between the end of the nipple 55 and an annular ring 69, which is inserted in the bore 70 of the extruder head. Radial grooves 71 in the end of the nipple 55 extend inwardly from the groove 68 to a lubricant distributing sleeve 72, which is located in an annular recess formed in the inner periphery of the annular block 69 and a block 74, which latter forms the restricted end of the extruding passage 24 of the extruder head. The lubricant distributing sleeve 72 is provided with an outer annular flange 75, which is clamped in a groove 73 between the annular blocks 69 and 74, the clamping pressure being provided by screwing the end of the nipple 55 down on the block 69. The spider 21, which acts as a bearing for the core 17, is also held centrally of the extruding passage 24 by the clamping pressure of the nipple 55, which transmits pressure to the annular block 74 and clamps the outer annular ring 76 of the spider 21 between the end of the block 74 and the end of the bore 70 in the head of the extruder 15. The lubricant sleeve 72 is tapered forwardly from the flange 75 to a thin edge, and the tapered portion of the sleeve is provided with a plurality of longitudinal slits 77, which divide the tapered portion into arcuated flexible blades 78, which are adapted to flex under the pressure of the lubricant in the radial passages 71. The pressure on the liquid lubricant is sufficient to force it between the distributing sleeve 72 and the bore in the nipple 55 and over the thin end of the sleeve 72 onto the outer surface of the plastic which passes through the lubricant distributing sleeve.

The lubricant for the inner walls of the plastic tube is fed under pressure through a pipe 79 which is connected to a passage 80 in the extension shaft 20 of the core 17. The pipe 79 is held against rotation by a bracket 81, and it is provided with a rotary connection with the passage 80 in the extension shaft 20 by means of a gland nut 82, which is screwed onto the end of the extension shaft 20, and retains a packing 83 compressed around the pipe 79 to prevent leakage between the passage 80 in shaft 20 and the pipe 79. The passage 80 terminates in radial passages 84 which admit the lubricant to the inside of a lubricant distributing sleeve 86, which is similar in construction to the lubricant sleeve 72. The lubricant distributing sleeve 86 is provided with an external flange 87 (Fig. 4), which is retained in place by a shoulder formed on the enlarged end of the extension shaft 20 and a shoulder formed in the bore of the reduced end of a retaining sleeve 88 which is screwed into and forms a part of the spider 21. The thin end of the inner lubricant sleeve 86 extends beyond the end of the retaining sleeve 88 and over the passages 84. The plastic tube passes over the tapered end of the lubricant distributing sleeve 86, and its flexible blades 89 are forced outwardly by the pressure of the lubricant entering through the radial passages 84 in the core extension 20 and thereby lubricate the internal wall of the plastic tube being extruded over and around the distributing sleeve 86. Sufficient lubricant is applied to the inside and to the outside of the plastic tube to permit it to pass over the core 17 and through the sleeve 16 without requiring excessive pressures to be exerted upon the plastic, and without disturbing the inner and outer surface structure of the plastic.

Sometimes an excess of lubricant is applied. The excess lubricant on the inside of the tube is drained from it after it passes from the end of the sleeve 16. As shown in Fig. 6, the excess lubricant on the outside of the sleeve is removed therefrom through passages 90 formed in a snubber 91 screwed onto the end of the sleeve 16. The purpose of the snubber 91 is to create a back pressure on the plastic in the sleeve so that the plastic will be compressed and completely fill the space between the core 17 and the sleeve 16. The snubbing action is controlled by screwing the snubber 91 onto or off of the sleeve. The outlet passage in the snubber 91 is reduced in diameter from the diameter of the sleeve by a taper, and as the tapered passage approaches the tapered end of the core 17, the passage for the plastic is restricted, and the back pressure is thereby applied to plastic in the sleeve 16.

In the case where the plastic tube is made from vulcanizable rubber compounds, it is set during its passage through the sleeve by the application of heat, which is supplied by the electrical resistance of the sleeve 16 to electrical currents which flow between the terminals 92. The terminals are connected in a conventional manner (not shown) to the sleeve 16 by brushes which make rotary sliding contact with the sleeve. Such brushes are carried by the insulated supports 93. When the rubber reaches the end of the sleeve 17 it has been vulcanized, and consequently the snubbing ring 91 does not permanently deform the walls of the elastic rubber, but merely causes them to thin out as they pass over the ends of the core 23. After the vulcanized rubber tube passes through the snubber ring 91, it immediately expands to its original size within the sleeve 16.

The cross-sectional shape of the finished tube may be circular and provided with a circular bore as shown in tube T of Fig. 7, or the tube may have a non-circular external cross-sectional shape and a round internal bore as shown in the tube $T_8$ of Fig. 8, or the tube may be provided with a circular external cross-sectional shape and a square, or non-circular internal bore as shown in the tube $T_9$ of Fig. 9, or the tube may be provided with a square or a non-circular external cross-sectional shape, and a similar non-circular bore as shown in the tube $T_{10}$ of Fig. 10. In all of the foregoing shapes, of course, the internal cross-sectional shape of the sleeve will have the external cross-sectional shape of the tube, and the external cross-sectional shape of the core will be the same as the internal cross-sectional shape of the bore in the sleeve. In the examples shown in Figs. 7, 8 and 9 the core or the sleeve may be rotated relatively with respect to each other, or they may be rotated together at the same rate of speed, but in the example shown in Fig. 10, it is essential that the core and the sleeve be rotated together at the same rate of speed. If either the sleeve or the core is rotated, regardless of whether relative rotation takes place between such members, a portion or all of the plastic body of the tube is given a spiral movement around the axis of the sleeve and the core as it passes through the sleeve. It is believed that this spiral course of the plastic equalizes the radial pressures between the plastic and the core in all directions and thereby maintains the axis of core concentric with the axis of the bore in the sleeve.

Preferably there should be relative rotation between the outer surface of the plastic tube T and the inner surface of the sleeve 16, and between the inner surface of the tube and the outer surface of the core 17 so as to produce a sliding spiral movement between the surfaces of the tube and the surfaces of the sleeve and core which make contact therewith. This action may result in the manufacture of a tube having round inner and outer cross-sectional dimensions as shown in Fig. 7, where either the core 17 or sleeve 16 is rotated relatively to each other. The spiral sliding contact has two beneficial effects. First the plastic is evenly distributed around the core because the radial pressures of the plastic between the core and the sleeve are equalized by spreading the plastic and smoothing out the unequal densities and viscosities of the plastic in localized areas, and second the lubricant is more uniformly distributed.

Whereas the beneficial effects of the spiral sliding movement between such surfaces of the tube and the sleeve and core are lost in respect to that surface which does not have a round cross-sectional contour, the benefits are obtained from the round cross-sections of either the inside or outside dimensions of the tube $T_8$ or $T_9$ as shown in Figs. 8 and 9.

In the event the core is rotated and the plastic rotates therewith, the shifting of the weight of the core onto all of the radii of the tube is effective for maintaining the core centered in respect to the plastic tube.

As illustrated by Fig. 10, such effect alone is sufficient to maintain the core centered in the plastic, even though there is no spiral sliding movement between the plastic and either the core or sleeve as illustrated in Fig. 10.

It has been found that the snubber for the plastic should be placed on the tube forming member (the core or the sleeve) which is actually rotated in the direction of the rotation of the tube. For example, in the event the sleeve is rotated and the core is held stationary the snubber should be carried by the sleeve as shown in Fig. 1, because the tube T rotates with the sleeve 16, but at a lesser rate. In the event the core is rotated and the sleeve is held stationary, the snubber should be carried by the core, as shown in Fig. 11, in which the core 94 is the rotatable member, and the sleeve 95 is the stationary member. The sleeve 95 has a uniform bore at its end and an expanding snubber 96 is affixed to the end of the core 94. The snubber 96 may be formed by drilling a bore 97 in the core and cutting slits 98 therein. A plug 99 is screwed into the bottom of the bore 97 to expand the divided walls of the bore, thereby forming an adjustable constriction between the core 94 and the sleeve 95 which produces back pressure on the plastic.

A modified form of the apparatus described above in reference to Figs. 1 to 10 is shown in Figs. 12 and 13 for forming tubular jackets on cores, such as cable conductors. This apparatus is similar to the one described above, excepting that the cable core 100 is substituted for the core 17, which projects into the outer sleeve 16 (Fig. 1) and forms the bore in the plastic tube T, and further excepting that no means is provided for lubricating the core 100, and the plastic jacket is adhered to the core and moves axially through the apparatus with the flow of the plastic. The cable conductor 100 is fed through a conduit 101, which is supported at its rear end by a bushing 103 in the extruder head 105 and at its forward end by a spider 106, which is positioned centrally of the extruder head passage 107. The conduit 101 is preferably held against rotation in the bushing 103, but may be rotated in the same manner as shaft 20 in Fig. 1. The plastic P' is forced through the extruder head 105 by the screw 108 and through the outer rotatable sleeve 109, which corresponds to and may be rotated in the same manner as the sleeve 16 in Fig. 1. The rotation of the sleeve 109 causes the plastic P' therein to rotate with it. Since the plastic P' is adhered to the core 100, the latter should be rotated at substantially the same speed as the surrounding plastic in order to maintain good adhesion and prevent strains from being produced in the plastic jacket on the core. Where short lengths of the core 100 are being covered, the adherence of the plastic to the core may be sufficient to produce the desired rotation of the core, and also draw it through the apparatus therewith.

In the case where continuous lengths of cores, such as cable conductors, are being covered, means are provided for rotating the core at approximately the speed of rotation of the plastic jacket formed therearound. For that purpose, as shown in Fig. 13, the cable core 100 is wound on a reel 110 and is led therefrom into the conduit 101. The reel 110 is rotatably mounted in a yoke 111, which is rotatable in a bearing 112 on an axis perpendicular to the axis of rotation of the reel 110 in the yoke. The axis of rotation of the yoke 111 is also concentric with the axis of rotation of the sleeve 109. The bearing 112 is carried by a base 113, and the yoke 111 is rotated by a gear 114, which is rotatably mounted on the end of the conduit 101. A rotatable connection between the gear 114 and the yoke 111 is formed by pins 115 which project from the gear 114 into opening 116 in a cross-member 117 of the yoke 111. The cable core 100 is led from the reel 110 through an opening in the member 117 and is then passed through the hollow hub in the gear 114 and into the conduit 101.

The gear 114 may be rotated at a suitable speed by a drive which is similar to the drive which rotates the sleeve 16 and the gear 46 shown in Fig. 1, and which correspond respectively to the sleeve 109 and the gear 114 in Figs. 11 and 12. The ratio of drive between the sleeves 109 and 114 may be selected to produce the desired number of revolutions per minute in the cable core 100.

The rotary sleeve 109 is united to the extruder head 105 by a rotary coupling 118, and the lubricant is fed to the outside of the plastic P' in the sleeve 109 through a pipe 119, which supplies the lubricant to an outer lubricant distributing sleeve 120 in the manner described in reference to Fig. 1. The plastic P', which forms the cable jacket, may be made from vulcanizable rubber, and such plasticized rubber may be treated in the sleeve as previously described so that it will be cured when discharged therefrom. A snubber similar to the snubber 91 in Fig. 6 may be employed to create the back pressure on the plastic in the sleeve 109 and discharge the excess lubricant as described in reference to Fig. 6. The reduction in the diameter of the bore in the snubber may be controlled to produce the desired back pressure.

In the event that the force of the plastic in the sleeve 109 is insufficient to draw the core 100 through the sleeve, a pulling device may be provided at the discharge end of the sleeve to pull the vulcanized end of the rubber jacket through the sleeve. Such apparatus may take the form of a reel mounted in a rotatable yoke similar to the construction shown in Fig. 13, excepting an additional mechanism may be installed in the yoke for winding the reel and pulling the jacketed cable from the sleeve which would be coiled around the reel.

Whereas several forms of this invention have been disclosed herein, it will be understood that changes in the details thereof may be made without departing from the spirit of this invention or the scope of the claims appended hereto.

Having thus described my invention, what I claim and desire to protect by Letters Patent is:

1. An apparatus for making hollow tubes comprising a sleeve, a long gravity deflectable core, means for firmly supporting said deflectable core centrally of said sleeve near one end thereof into which the core is adapted to project and form a relatively long annular passage between it and said sleeve of uniform cross sectional area from near its entrance end to near its discharge end, means for forcing plastic material around the core and through said sleeve from the direction of said core supporting means, means for suspending the deflectable portion of the core in said sleeve on the plastic therein and centrally of said sleeve, which includes means for rotating at least one of said annular passage forming members and thereby rotating the plastic therein.

2. An apparatus for making hollow tubes comprising a sleeve, a gravity deflectable core projecting into said sleeve and forming an annular passage therebetween, means for firmly supporting said core at one end of said sleeve only, means for forcing plastic material around said core and through said sleeve from the firmly supported end of said core, means for setting said plastic around the opposite end of said core, means for restraining the flow of said set plastic from said sleeve, and means for rotating at least one of said passage forming members about its longitudinal axis, whereby said core, said sleeve, and the plastic therein are maintained in a concentric axial relationship.

3. An apparatus for making hollow tubes comprising a relatively long sleeve, means for firmly supporting each end of said sleeve to maintain its axis in a straight line, a relatively long core projecting into said sleeve and forming a relatively long annular passage between said members of uniform cross sectional area from near its entrance end to near its discharge end, means for firmly supporting said core near one end of said sleeve, the portion of said core projecting into said sleeve being suspended from said support and its suspended end being deflectable by gravity from the axis of said sleeve, means for continuously forcing a body of plastic material through said passage, and means for rotating at least one of said passage forming members about its longitudinal axis and thereby floating said deflectable portion of said core on said plastic and concentric with the axis of said sleeve.

4. An apparatus for making hollow tubes comprising a sleeve, means for firmly supporting a long gravity deflectable core centrally of said sleeve near one end thereof into which the core is adapted to project and form an annular passage between it and said sleeve, means for forcing plastic material around the core and through said sleeve from the direction of said core supporting means, means for suspending the deflectable portion of the core in said sleeve on the plastic therein and centrally of said sleeve, which includes means for rotating at least one of said annular passage forming members and thereby rotating the entire body of plastic therewith; and means for setting said plastic over the deflectable end of said core in said passage during its passage therethrough.

5. An apparatus for making hollow tubes comprising a sleeve, a long deflectable core projecting into said sleeve and forming an annular passage therebetween, means for firmly supporting said core at one end of said sleeve only and concentric to the axis of said bore in said sleeve and the other end of said core being unsupported and deflectable by gravity from said axis of said sleeve, means for continuously forcing a body of plastic through said passage at a uniform rate of flow; means for restraining the flow of said plastic from said sleeve, means for rotating said sleeve around said core and carrying the plastic in said sleeve with it around said core to maintain said deflectable portion of said core concentric with said sleeve and said plastic surrounding said core, and means for setting said plastic in said sleeve during said rotational movement.

6. An apparatus comprising a stationary sleeve, a deflectable core projecting into said sleeve and forming an annular passage therebetween, means for firmly supporting said core at one end of said sleeve only and concentric to the axis of said bore in said sleeve, means for continuously forcing a body of plastic through said passage, means for rotating said core in said sleeve to maintain said deflectable portion of said core concentric with said sleeve and said plastic surrounding said core, and means for setting said plastic in said sleeve during said rotational movement.

7. An apparatus comprising a sleeve, a core projecting into said sleeve and forming an annular passage therebetween, means for firmly supporting said core at one end of said sleeve only and concentric to the axis of said bore in said sleeve and the other end of said core being unsupported and deflectable by gravity from said axis of said sleeve, means for continuously forcing a body of plastic through said passage, means for rotating said sleeve and said core at the same speed and in the same direction to maintain said deflectable portion of said core concentric with said sleeve and said plastic surrounding said core, and means for setting said plastic in said sleeve during said rotational movement.

8. An apparatus for making hollow tubes comprising a sleeve, means for firmly supporting a long gravity deflectable core centrally of said sleeve near one end thereof into which the core is adapted to project and form an annular passage between it and said sleeve, means for forcing plastic material around the core and through said sleeve from the direction of said core supporting means, means for lubricating the outer surface of said passage, means for suspending the deflectable portion of said core in said sleeve on the plastic therein and centrally of said sleeve, which includes means for rotating at least one of said annular passage forming members and thereby rotating the entire body of plastic therewith, and means for setting said plastic over said core in said passage during its travel therethrough.

9. An apparatus comprising a sleeve, means for firmly supporting a deflectable core centrally of said sleeve near one end thereof into which the core is adapted to project and form an annular passage between it and said sleeve, means for forcing plastic material around the core and carrying said core with it through said sleeve from the direction of said core supporting means, means for lubricating the outer surface of said passage only, means for suspending the deflectable portion of said core in said sleeve on the plastic therein and centrally of said sleeve, which includes means for rotating both of said annular passage forming members in the same direction, and setting said plastic in said passage during its travel therethrough.

10. An apparatus for continuously extruding and setting a tube of plastic material comprising a sleeve, a long core projecting into said sleeve and forming an annular passage therebetween, means for firmly supporting said core at one end of said sleeve only and concentric to the axis of the bore in said sleeve, the end of said core at the other end of said sleeve being deflectable from the axis of said bore, means for continuously forcing a body of plastic through said passage and around said core, means for lubricating the bore in said sleeve and the outer surface of said core, means for rotating said sleeve relatively to said core and thereby rotating the entire body of plastic and maintaining the deflectable portion of said core concentric with said sleeve, means for creating a back pressure on said plastic throughout the length of said sleeve, and means for setting said plastic in said sleeve over said core during said rotational movement of said sleeve.

11. An apparatus for making extruded tubes from vulcanizable rubber compositions comprising an extruder head, a long outer forming sleeve connected to said head, a core positioned in and approximately as long as said sleeve, a support for said core near said head and adapted to space said core in a centered position from the inner walls of said sleeve, the opposite end of said core being unsupported and adapted to be flexed within said sleeve, means for lubricating the inner wall of said sleeve and the outer wall of said core adjacent to said extruder head, means for producing a back pressure on said rubber composition in said sleeve at the outlet end thereof, and means for rotating said plastic in the space between said core and outer sleeve, and means for vulcanizing said rubber composition over said core during its passage through said sleeve.

12. An apparatus for making extruded tubes from vulcanizable rubber compositions comprising an extruder head, and outer forming sleeve connected to said head, a deflectable core positioned in said sleeve and forming an annular passage between it and said sleeve of sufficient length to permit the vulcanization of said rubber composition during its passage therethrough, a support for said core near said head and adapted to space said core in a centered position from the inner walls of said sleeve, the opposite end of said core being unsupported and adapted to be flexed within said sleeve, means for lubricating the inner walls of said sleeve and the outer wall of said core adjacent to said extruder head, means for producing a back pressure on said rubber composition in said sleeve at the outlet end thereof, and means for rotating said core and outer sleeve relatively to each other and imparting a spiral movement to said plastic in said passage to maintain said deflectable core centered in said passage, and means for vulcanizing said rubber composition during its passage through said sleeve.

13. The method of continuously forming and setting plastic tubes having concentric inner and outer surfaces comprising the steps of forcing plastic material through a passage formed between a sleeve and a core having a gravity deflectable portion extending into the sleeve, rotating the entire body of plastic about the axis of said sleeve to maintain said core centered in said plastic, and setting said rotating body of plastic around said core during its travel through said sleeve.

14. The method of continuously forming and setting plastic tubes having concentric inner and outer surfaces, comprising the steps of forcing plastic material through a passage formed between a sleeve and a core having a gravity deflectable portion extending into said sleeve, lubricating the outer surface of said tube, rotating the entire body of plastic about the axis of said sleeve to maintain the deflectable portion of the core centered in respect to said rotating body of plastic, and setting said plastic over said deflectable portion of said core during its travel through said sleeve.

15. The method of continuously forming and setting plastic tubes having concentric inner and outer surfaces, the steps of forcing plastic material through a passage formed between a sleeve and a core having a flexible portion positioned in said sleeve, lubricating the outer and inner surfaces of said tube, rotating the entire flowing body of plastic about the axis of said sleeve to maintain the flexible portion of the core centered in respect to said plastic, producing back pressure on the plastic in said passage, and setting said rotating body of plastic over said flexible portion of said core during its travel through said sleeve.

NATHANIEL H. CURTISS.

References Cited in the file of this patent

UNITED STATES PATENTS

| Number | Name | Date |
| --- | --- | --- |
| 121,166 | Griffin | Nov. 21, 1871 |
| 454,030 | Clark | June 16, 1891 |
| 704,698 | Edison | July 15, 1902 |
| 1,770,396 | Fuller et al. | July 15, 1930 |
| 1,904,197 | Bond | Apr. 18, 1933 |
| 2,144,213 | Bassett et al. | Jan. 17, 1939 |
| 2,443,289 | Bailey | June 15, 1948 |

FOREIGN PATENTS

| Number | Country | Date |
| --- | --- | --- |
| 671,490 | Germany | Jan. 19, 1939 |